W. A. BURGER.
WRENCH.
APPLICATION FILED NOV. 17, 1909.

999,361.

Patented Aug. 1, 1911.

UNITED STATES PATENT OFFICE.

WILLIAM A. BURGER, OF PIERRE, SOUTH DAKOTA.

WRENCH.

999,361.  Specification of Letters Patent.  Patented Aug. 1, 1911.

Application filed November 17, 1909. Serial No. 528,560.

*To all whom it may concern:*

Be it known that I, WILLIAM A. BURGER, a citizen of the United States, residing at Pierre, county of Hughes, and State of South Dakota, have invented certain new and useful Improvements in Wrenches, of which the following is a specification.

My invention relates to wrenches.

The present invention has for its object the provision of a wrench of the sliding jaw, claw lever type of novel construction, provided with novel means for locking the claw lever in any position desired.

The invention may be carried out in different ways, a preferred construction embodying a fixed jaw and shank, a sliding jaw having a rack, a claw lever pivoted to the shank and engaging the rack aforesaid, and a locking device interposed between the handle and the shank consisting of teeth and a dog or latch, as more particularly shown in the accompanying drawings, in which:—

Figure 1 is a perspective view; Fig. 2, a side elevation, partly broken away and partly in section; and Fig. 3, detached detail views of the jaws and the shank and Fig. 4, a perspective detail of the locking dog.

The fixed jaw 1 has a preferably integral shank section 2 which is flanked by flanges 3 which provide a channel or guide 4 for the sliding jaw. The other shank section 5 is provided with a channel or guide 6 and with arms 7 which straddle the end of the shank section 2, abut the ends of the flanges 3, and are secured to the shank section 2 by a suitable rivet or other fastening 8 passing through the holes in the said parts. The rear end of the shank section 5 is provided with teeth 9 and 10, arranged to correspond on the rear edges of the side walls thereof.

The sliding jaw 11 is provided with a rack 12 on its inner edge, the shoulders 13 of the jaw 11, sliding upon the tops of the flanges 3 and the said rack 12 sliding between the said flanges. The formation of the shank 14 of the sliding jaw is the same as guide 6, in which it slides. This construction prevents any turning or twisting of the sliding jaw.

Pivoted on a suitable pin or screw 15 is the handle 16, the pivoted part of the handle lying in between the sides of the shank section 5 and being provided with a claw 16ª which is engageable with the rack 12 when the handle is in line with the shank sections but when the handle is swung downwardly the claw disengages from the shank and the sliding jaw can then be quickly shifted to engage the nut or other article located between it and the fixed jaw 1 and thereafter the handle may be raised to re-engage the claw with the rack. Continued upward pressure on the handle will all the more tighter force the sliding jaw into engagement with the object being gripped but in order that the handle may be securely locked so that the wrench may be operated in both directions at any time without any disengagement of the claw from the shank or any retraction of the sliding jaw, I have provided the teeth 9 and 10 and the locking dog, shown more particularly in Fig. 4.

The locking dog is shown in duplex form, but a single dog and a single row of teeth would suffice. Indeed, the dog and the teeth could be reversed in arrangement from that shown and other locking devices could even be substituted, all within the scope of my invention. In the present instance, however, the dog is provided with twin members 18 having heads 19 to engage the teeth 9 and 10, the parts being connected by a cross-piece 20 through which is threaded a clamping screw 21. The dog straddles a reduced part 22 on the handle and is pivoted thereto by a pin 23. Leaf-springs 24, secured either to the dog or to the handle, are interposed between the dog and the shoulders 25 on the handle and normally cause engagement of the heads 19 with the teeth 9 and 10.

In rocking the handle upwardly, the jaw 11 more tightly binds the object gripped, the greater the pressure that is applied to the handle and in many instances the use of the locking dog is not required, in which event the set screw 21 is used to bind the dog, in retracted position, to the handle, but when said dog is used, the thumb-screw 21 is loose and the springs 24 throw the heads 19 into engagement with the teeth 9 and 10, the heads engaging the successive teeth as the handle is tightened and the object gripped by the jaws, said heads preventing any release of the tightened engagement of the claw and rack. To release the jaws from the object, the dog is pressed back and the handle then thrown down.

Having thus described my invention, what I claim as new and desire to secure by Letters Patent, is:—

In a wrench, the combination with a shank having a jaw, of a movable jaw, a handle jointed to the shank and having means engaging the movable jaw, and latching means for securing the shank and handle together, consisting of a row of teeth on one of them, a spring-actuated dog pivoted to the other of them and adapted to engage the teeth aforesaid, and a clamping screw carried by said dog adapted to lock the dog in retracted position.

In testimony whereof, I hereunto affix my signature in presence of two witnesses.

WILLIAM A. BURGER.

Witnesses:
 THOMAS H. GILLASPIE,
 E. P. GILLASPIE.

Copies of this patent may be obtained for five cents each, by addressing the "Commissioner of Patents, Washington, D. C."